United States Patent
Ucar et al.

(10) Patent No.: US 11,410,548 B2
(45) Date of Patent: Aug. 9, 2022

(54) SYSTEMS AND METHODS OF CREATING AND UTILIZING DEPENDENT VEHICULAR MICRO CLOUDS

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Baik Hoh, Campbell, CA (US); Onur Altintas, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 113 days.

(21) Appl. No.: 16/847,197

(22) Filed: Apr. 13, 2020

(65) Prior Publication Data

US 2021/0319692 A1    Oct. 14, 2021

(51) Int. Cl.
*G08G 1/01* (2006.01)
*H04W 4/46* (2018.01)
*G01C 21/34* (2006.01)

(52) U.S. Cl.
CPC ....... *G08G 1/0133* (2013.01); *G01C 21/3415* (2013.01); *G01C 21/3461* (2013.01); *G01C 21/3492* (2013.01); *G08G 1/0112* (2013.01); *G08G 1/0141* (2013.01); *G08G 1/0145* (2013.01); *H04W 4/46* (2018.02)

(58) Field of Classification Search
CPC ............ G01C 21/3415; G01C 21/3461; G01C 21/3492; G08G 1/0112; G08G 1/0141; G08G 1/0145; G08G 1/0133; H04W 4/46
See application file for complete search history.

(56) References Cited

U.S. PATENT DOCUMENTS

| | | | |
|---|---|---|---|
| 9,805,600 B2* | 10/2017 | Park | G08G 1/0967 |
| 10,992,752 B2* | 4/2021 | Graefe | H04W 84/18 |
| 11,106,209 B2* | 8/2021 | Ucar | G06F 16/9024 |

(Continued)

OTHER PUBLICATIONS

Dressler et al., "Virtual Edge Computing Using Vehicular Micro Clouds," 2019 International Conference on Computing, Networking and Communications, 5 pages.

(Continued)

*Primary Examiner* — Luis A Martinez Borrero
(74) *Attorney, Agent, or Firm* — Christopher G. Darrow; Darrow Mustafa PC

(57) ABSTRACT

System, methods, and embodiments described herein relate to creating and utilizing one or more vehicular micro clouds to assist in responding to a traffic event. At least one disclosed method includes receiving report information indicating a detection of a traffic event and including a location of the traffic event, defining a region of interest based at least in part on the report information, forming a dependent vehicular micro cloud in the region of interest, determining guidance information based at least in part on the report information, and transmitting the guidance information to the dependent vehicular micro cloud. The dependent vehicular micro cloud executes at least one responsive action based on the guidance information.

21 Claims, 6 Drawing Sheets

(56) References Cited

U.S. PATENT DOCUMENTS

| | | | |
|---|---|---|---|
| 2017/0098370 A1* | 4/2017 | Park | G08G 1/0967 |
| 2018/0122237 A1* | 5/2018 | Nascimento | G08G 1/127 |
| 2018/0238698 A1* | 8/2018 | Pedersen | B60L 58/16 |
| 2019/0014446 A1 | 1/2019 | Gade et al. | |
| 2019/0043347 A1* | 2/2019 | Biehle | G08G 1/096716 |
| 2019/0132709 A1* | 5/2019 | Graefe | G08G 1/0133 |
| 2019/0132819 A1 | 5/2019 | Tseng et al. | |
| 2019/0222652 A1* | 7/2019 | Graefe | H04W 84/18 |
| 2019/0244518 A1* | 8/2019 | Cheng | G08G 1/0145 |
| 2019/0311616 A1* | 10/2019 | Jin | G05D 1/0297 |
| 2020/0005633 A1* | 1/2020 | Jin | G06F 21/6254 |
| 2020/0020227 A1* | 1/2020 | Ran | G08G 1/075 |
| 2020/0029233 A1* | 1/2020 | Gallagher | H04B 17/27 |
| 2020/0152056 A1* | 5/2020 | Zhang | G08G 1/081 |
| 2020/0153902 A1* | 5/2020 | Higuchi | H04W 4/44 |
| 2020/0200563 A1* | 6/2020 | Martin | G08G 1/0145 |
| 2020/0201353 A1* | 6/2020 | Martin | G05D 1/0212 |
| 2020/0202711 A1* | 6/2020 | Martin | G01C 21/3492 |
| 2020/0226921 A1* | 7/2020 | Higuchi | H04W 4/40 |
| 2020/0257298 A1* | 8/2020 | Ucar | H04W 4/021 |
| 2020/0313959 A1* | 10/2020 | Higuchi | H04L 67/12 |
| 2020/0374053 A1* | 11/2020 | Hwang | H04W 4/40 |
| 2021/0014656 A1* | 1/2021 | Mueck | H04W 4/40 |
| 2021/0055122 A1* | 2/2021 | Pham | G01C 21/3694 |
| 2021/0063546 A1* | 3/2021 | Slobodyanyuk | G01S 17/931 |
| 2021/0082210 A1* | 3/2021 | Sakr | H04W 4/44 |
| 2021/0211851 A1* | 7/2021 | Higuchi | H04L 67/10 |
| 2021/0218692 A1* | 7/2021 | Higuchi | H04L 67/10 |
| 2021/0295684 A1* | 9/2021 | Cen | G08G 1/0145 |
| 2021/0306682 A1* | 9/2021 | Ucar | H04W 4/029 |

OTHER PUBLICATIONS

Mahmood et al., "Software-Defined Heterogeneous Vehicular Networking: The Architectural Design and Open Challenges," Future Internet, Nov. 2019, 70, 17 pages.

Shrestha et al., "Challenges of Future VANET and Cloud-Based Approaches," Wireless Communications and Mobile Computing, vol. 2018, Article ID 5603518, 15 pages (2018).

Muhammad et al., "From Vehicular Networks to Vehicular Clouds in Smart Cities," Smart Cities and Homes Key Enabling Technologies, Chapters, p. 149-171 (2016).

Wan et al., "Mobile Crowd Sensing forTraffic Prediction in Internet of Vehicles," Sensors 2016, 16, 88, 15 pages (2016).

* cited by examiner

SYSTEMS AND METHODS OF CREATING AND UTILIZING DEPENDENT VEHICULAR MICRO CLOUDS

TECHNICAL FIELD

The subject matter described herein relates, in general, to a system and method for controlling vehicular micro clouds, and, more particularly, to creating and utilizing multiple vehicular micro clouds to obtain information and collectively prepare to respond to a traffic event within a given region.

BACKGROUND

Two or more vehicles can establish communications connections to form a group of interconnected vehicles (e.g., via vehicle-to-everything, i.e., "V2X") that are located within a common vicinity. Such groups are known as "vehicular micro clouds" or simply "micro clouds." Vehicle members in a micro cloud (i.e., "members") can have varying types of resources and capabilities, for example, depending on the model/make of the vehicle. Members in a micro cloud can share their resources with other members of the micro cloud to collaborate on operational tasks, such as, for example, environmental sensing, data processing and data storage.

Micro clouds may travel through areas that experience delays and traffic jams due, for example, to accidents, rush hour, lane closures, etc. When a micro cloud becomes entrenched in dense traffic, it is often too late for information, for example, from a lead vehicle of the cloud to a trailing member to provide enough warning to avoid the situation.

SUMMARY

The disclosed devices, systems and methods relate to creating and controlling multiple vehicular micro clouds to quickly obtain information about a traffic event and, based on the information, create dependent micro clouds in relevant areas around a core area of the traffic event and transmit guidance information to the dependent micro clouds to prompt action prior to vehicle members of the dependent micro clouds arriving at the core area.

In one embodiment, a system includes a vehicle onboard unit including a first set of one or more processors and a memory communicably coupled to the first set of one or more processors. The memory can store a detection module including instructions that when executed by the first set of one or more processors cause the first set of one or more processors to detect a traffic event.

The memory can also store a formation module including instructions that when executed by the first set of one or more processors cause the first set of one or more processors to broadcast one or more communications to form a vehicular micro cloud to obtain data about the traffic event.

In addition, the memory can store a reporting module including instructions that when executed by the first set of one or more processors cause the first set of one or more processors to collect the data obtained by the vehicular micro cloud and transmit report information to a server, the report information including the data and location information of a location associated with the data.

The system can further include a server including a second set of one or more processors and a second memory communicably coupled to the second set of one or more processors. The second memory can store a regional manager module including instructions that when executed by the second set of one or more processors cause the second set of one or more processors to receive the report information and define a region of interest based at least in part on the report information.

The second memory can also store a cloud manager module including instructions that when executed by the second set of one or more processors cause the second set of one or more processors to form a dependent vehicular micro cloud in the region of interest, determine guidance information based at least in part on the report information, and transmit the guidance information to the dependent vehicular micro cloud. The dependent vehicular micro cloud executes at least one responsive action based on the guidance information.

In another embodiment, a system includes one or more processors and a memory communicably coupled to the first set of one or more processors. The memory can store a regional manager module including instructions that when executed by the one or more processors cause the one or more processors to: receive report information indicating a detection of a traffic event and including a location of the traffic event, and define a region of interest based at least in part on the report information.

The memory can also store a cloud manager module including instructions that when executed by the one or more processors cause the one or more processors to form a dependent vehicular micro cloud in the region of interest, determine guidance information based at least in part on the report information, and transmit the guidance information to the dependent vehicular micro cloud. The dependent vehicular micro cloud executes at least one responsive action based on the guidance information.

In another embodiment, a method for creating and utilizing one or more vehicular micro clouds to assist in responding to a traffic event includes detecting a traffic event, forming an initial vehicular micro cloud to obtain data about the traffic event, collecting the data obtained by the vehicular micro cloud, and transmitting report information to a server, the report information including the data and location information of a location associated with the data.

The method further includes defining, by the server, a region of interest based at least in part on the report information, forming, by the server, a dependent vehicular micro cloud in the region of interest, determining, by the server, guidance information based at least in part on the report information, and transmitting, by the server, the guidance information to the dependent vehicular micro cloud. The dependent vehicular micro cloud executes at least one responsive action based on the guidance information.

In still another embodiment, a method for creating and utilizing one or more vehicular micro clouds to assist in responding to a traffic event includes receiving report information indicating a detection of a traffic event and including a location of the traffic event, defining a region of interest based at least in part on the report information, forming a dependent vehicular micro cloud in the region of interest, determining guidance information based at least in part on the report information, and transmitting the guidance information to the dependent vehicular micro cloud. The dependent vehicular micro cloud executes at least one responsive action based on the guidance information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with creating and controlling a plurality of vehicular micro clouds to collect information about a traffic event and appropriately disseminate the information to prompt evasive action are disclosed. A vehicle implementing an embodiment of the disclosed subject matter can, upon detecting a traffic-related event, communicate with local vehicles to form an initial micro cloud, which can be, for example, an on-demand vehicular micro cloud or a stationary micro cloud. The initial vehicular micro cloud can be formed instilled with the primary purpose of collecting information regarding the traffic related event. In some situations, the single, initiating vehicle may have only been able to obtain limited information due, for example, to being positioned multiple lanes away from the source of the event or otherwise having its view of the source blocked. However, the initial vehicular micro cloud can occupy and scan a much larger area and gather more comprehensive information indicating the source and circumstances of the situation.

Nevertheless, in many cases the initial vehicular micro cloud may already be too near the source of the traffic event to completely evade it. For example, if the event is an accident on the highway and the vehicle members of the initial vehicular micro cloud have already passed the nearest exit, the vehicle members may be forced to wait in traffic line(s) and attempt to navigate past the situation. Yet, while navigating near the source of disturbance the initial vehicular micro cloud can obtain invaluable information regarding the situation.

Therefore, a vehicular micro cloud coordination system and associated methods are disclosed herein that provide an approach to improve micro cloud utilization by creating an initial vehicular micro cloud at or near a source area where a traffic event is detected, utilizing the initial vehicular micro cloud to obtain information associated with the traffic event, creating one or more dependent vehicular micro clouds in a region of interest displaced a distance away from the source area, and providing guidance information to the dependent vehicular micro cloud(s) that cause the dependent vehicular micro cloud(s) to execute an evasive or responsive action. For example, an evasive action can be one or more of adjusting a route to exit a highway, assuming a formation optimal for navigating past the upcoming traffic event, changing lanes, etc.

Figure 1:
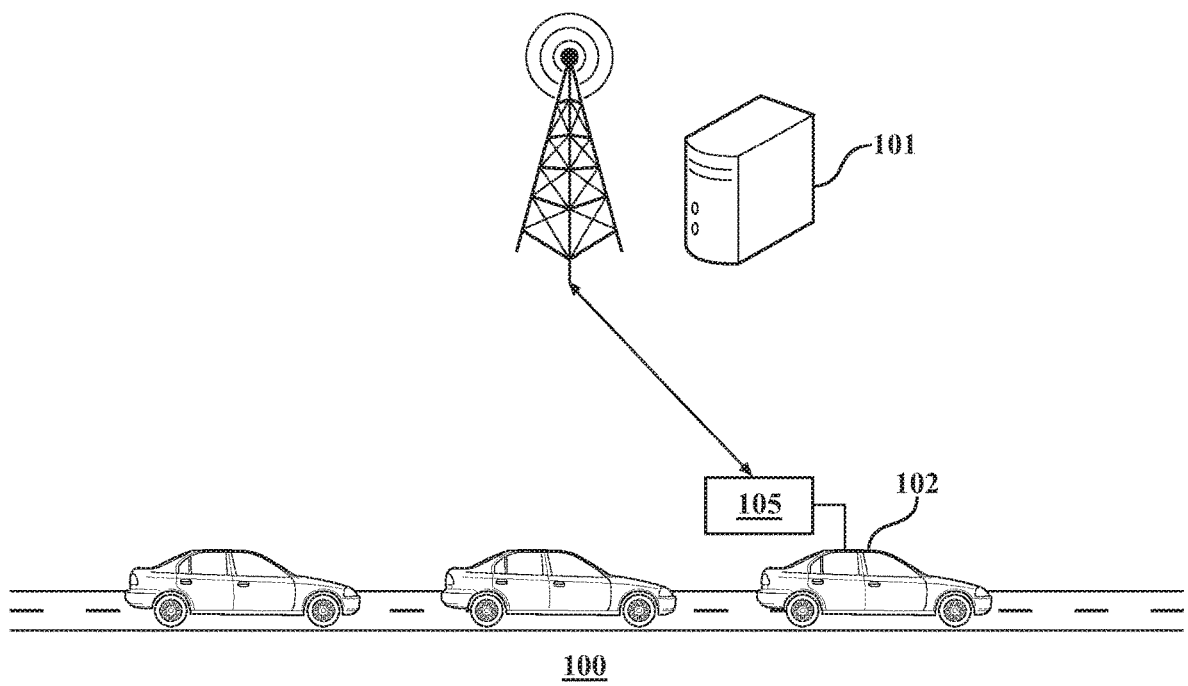
FIG. 1 illustrates one embodiment of a vehicular micro cloud coordination system implementing an on-demand vehicular micro cloud according to the disclosed embodiments.

Referring to FIG. 1, the disclosed vehicular micro cloud coordination system 100 can include a regional server 101 in communication with an onboard unit 105 of a vehicle 102. FIG. 1 shows an example embodiment of the disclosed vehicular micro cloud coordination system 100 implementing an on-demand vehicular micro cloud. However, it should be understood that the disclosed subject matter is applicable to on-demand, mobile, dynamic or stationary vehicular micro clouds.

Figure 2:
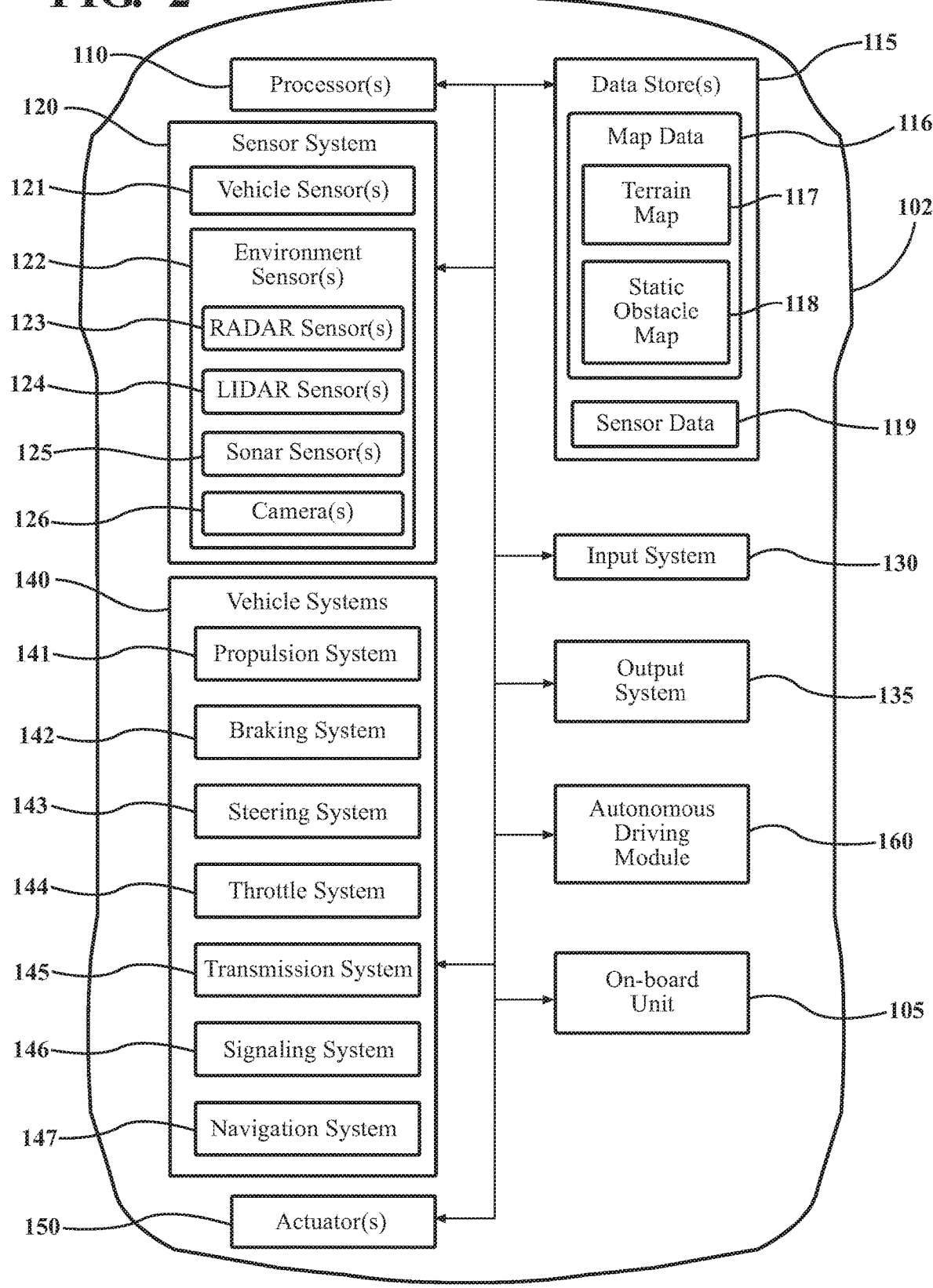
FIG. 2 illustrates one embodiment of a vehicle according to the disclosed embodiments.

FIG. 2 shows an example of a vehicle 102. As used herein, a "vehicle" is any form of powered transport. In one or more implementations, the vehicle 102 is an automobile, e.g., a hybrid/electric automobile, an autonomous/semi-autonomous automobile, a combination thereof, etc. While arrangements will be described herein with respect to automobiles, it will be understood that embodiments are not limited to automobiles. In some implementations, the vehicle 102 may be any form of powered transport that, for example, can encounter and/or detect a traffic event, and thus can benefit from the functionality discussed herein.

As shown in FIG. 2, the vehicle 102 can include multiple elements. It should be understood that in various embodiments it may not be necessary for the vehicle 102 to have all of the elements shown in FIG. 2. The vehicle 102 can have any combination of the various elements shown in FIG. 2. Further, the vehicle 102 can have additional elements to those shown in FIG. 2. In some arrangements, the vehicle 102 may be implemented without one or more of the elements shown in FIG. 2. While the various elements are shown as being located within the vehicle 102 in FIG. 2, it will be understood that one or more of these elements can be located external to the vehicle 102. Further, the elements shown may be physically separated by large distances.

Some of the possible elements of the vehicle 102 are shown in FIG. 2 and will be described along with subsequent figures. However, a more detailed description of many of the elements in FIG. 2 will be provided after the discussion of FIGS. 3-6 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art will understand that the embodiments described herein may be practiced using various combinations of these elements.

In any case, the vehicle 102 includes an onboard unit 105 that is implemented to perform methods and other functions as disclosed herein relating to detecting traffic events, forming vehicular micro clouds, and reporting information. The noted functions and methods will become more apparent in the following discussion of the figures.

Figure 3:
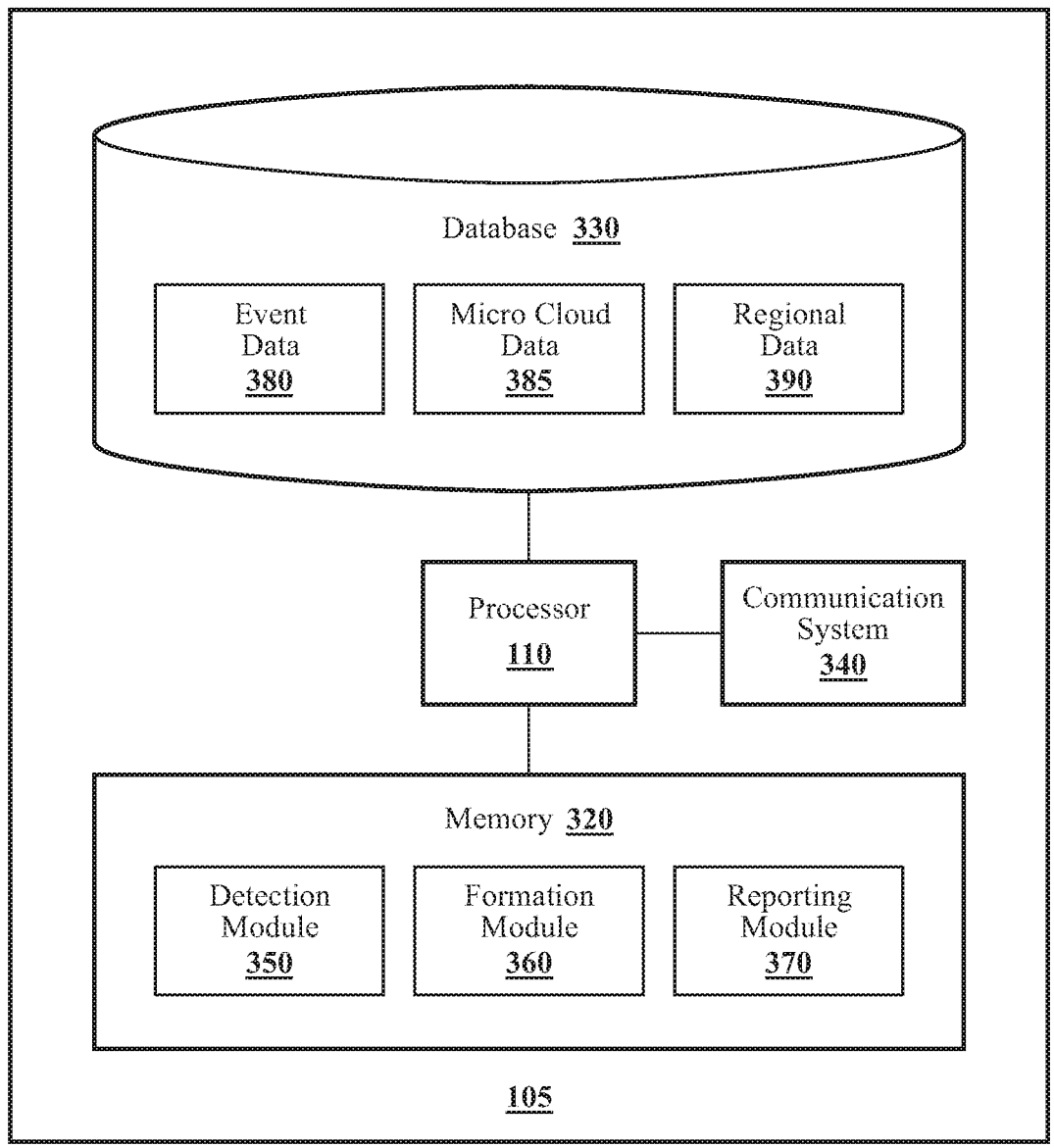
FIG. 3 illustrates one embodiment of an onboard unit according to the disclosed embodiments.

FIG. 3 illustrates an embodiment of the onboard unit 105 of FIG. 2. In one or more embodiments the onboard unit 105 can be installed, for example, in a stationary vehicle (e.g., parked) or a moving vehicle. The onboard unit 105 is shown including a processor 110, a memory 320, database 330, and a communication system 340. In other embodiments more or fewer components than those shown can be included according to an implementation of the disclosed subject matter.

In one or more embodiments, the processor 110 may be a part of the onboard unit 105, or the onboard unit 105 may access the processor 110 through an in-vehicle connection (e.g., as shown in FIG. 2) or a network communication. The processor 110 may be one or more processors according to the processing power required or preferred per implementation.

The memory 320 can be implemented as a random-access memory (RAM), read-only memory (ROM), a hard-disk drive, a flash memory, or other suitable memory for storing, among other things, a detection module 350, a formation module 360 and a reporting module 370. The modules 350, 360 and 370 will be described further below.

The database 330 can store, among other information, event data 380, micro cloud data 385 and regional data 390, which will be also described further below. The database 330 is, in one or more embodiments, an electronic data structure that can be a data store integral with the onboard unit 105, a removable memory device that can be installed in or removed from the onboard unit 105, or another network-based data store that is accessible to modules 350, 360 and 370 stored in the memory 320. In one or more embodiments the database 330 can be accessible to external systems, such as cloud or edge servers, micro cloud members, or road-side units. The database 330 is configured with routines that can be executed by the processor 110 for analyzing stored data, accessing and providing stored data, organizing stored data, and so on. Thus, in one embodiment, the database 330 stores and manages/updates data, such as event data 380, micro cloud data 385 and regional data 390, as well as other types of data that are used by modules 350, 360 and 370 in executing various functions.

The communication system 340 can be implemented as, for example, a wireless communication system including one or more transmitting/receiving devices, one or more transmitting/receiving antennas and a controller for transmitting and receiving data over a wireless network using any of a variety of protocols, such as vehicle-to-vehicle (V2V), vehicle-to-everything (V2X), general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The communication system 340 can also include vehicle-to-cloud, vehicle-to-datacenter and any type of V2X communication protocol. In one or more embodiments, the communication system 340 can be configured to receive, for example, event data 380, micro cloud data 385 and regional data 390 from one or more reporting entities, such as various members of the micro cloud.

The modules 350, 360 and 370 can be, for example, constructed as computer-readable instructions that when executed by the processor 110 cause the processor 110 to perform the various functions disclosed herein.

The detection module 350 generally includes instructions that function to control the processor 110 to detect a traffic event. In one or more embodiments the traffic event can be a pre-defined event, such as entering a type of zone or area (e.g., a construction zone or school zone). In one or more embodiments the traffic event can be an accident or a detected abnormality. For example, in one or more embodiments the detection module 350 can detect a Post Crash Notification (PCN) being broadcast in a vicinity of the vehicle 102. In some situations a vehicle involved in an accident may not be equipped to broadcast a PCN. Accordingly, in one or more embodiments the detection module 350 can weigh one or more contextual factors to identify abnormal behavior patterns that indicate a traffic event has occurred in a vicinity of the vehicle 102. The contextual factors can include, for example, abnormal speed/navigation exhibited by the vehicle 102 as indicated by operational data obtained from one or more vehicle systems 140 (FIG. 2), or sensor data 119 obtained from the vehicle sensor system 120 (FIG. 2) indicating abnormal speed/navigation of other vehicles in the vicinity of the vehicle 102.

For example, in one or more embodiments the detection module 350 can obtain a location and current speed of the vehicle 102 (e.g., from the navigation system 147 and the propulsion system 141, FIG. 2) and determine that the current speed of the vehicle 102 is below a local speed limit by a threshold amount, the local speed limit being obtained, e.g., based on map data 116, lookup tables or the like. In one or more embodiments the detection module 350 can determine that one or more vehicles in a vicinity of the vehicle 102 are exhibiting abnormal behavior patterns based on a machine learning algorithm. The machine learning algorithm can be trained to receive, as input, data derived from sensor data 119, such as object detection data and trajectory data, and determine whether the input data indicate normal or abnormal behavior.

The detection module 350 is not limited to the above-described detection methods and events. Other types of techniques can be used to detect a traffic event, including, for example, obtaining or receiving a report from an external source, such as a traffic or weather report service, a road-side unit, etc. Other types of events can be pre-defined with associated detection methods. For example, in one implementation the detection module 350 can analyze map data 116 to detect an event such as entry into a particular zone, such as a construction zone or school zone.

In any case, when the detection module 350 detects, in any way, a traffic event in a vicinity of the vehicle 102, the formation module 360 takes responsive action. The formation module 360 generally includes instructions that function to control the processor 110 to broadcast one or more communications to form an initial vehicular micro cloud to obtain data about the traffic event. In one or more embodiments the formation module 360 can broadcast micro cloud formation requests to one or more vehicles within a threshold range of the vehicle 102. The formation module 360 can receive one or more positive responses and proceed to establish communication channels with the affirming vehicles to create intra-vehicle network and form an initial vehicular micro cloud.

The formation module 360 can further include instructions to initiate a sensing or information gathering task as a micro cloud operation submitted to the initial vehicular micro cloud. Herein, a "micro cloud operation" refers to a task (e.g., a computational task, sensing task, network task, communication task, etc.) performed in the micro cloud environment and that two or more connected vehicles or members in a micro cloud contribute to completing. For example, an environmental sensing micro cloud operation can involve multiple vehicle members of the initial vehicular micro cloud obtaining sensor data indicating aspects of an environment around the initial vehicular micro cloud.

The reporting module 370 generally includes instructions that function to control the processor 110 to collect the data obtained by the initial vehicular micro cloud and transmit report information to the regional server 101, the report information including the data and location information of a location associated with the data. In one or more embodiments, the reporting module 370 and/or the initial vehicular micro cloud can process the sensor data to obtain information (e.g., object detection/identification, trajectory detection, etc.), and aggregate the information to obtain knowledge (e.g., three vehicles stopped on the highway in a row touching each other while other vehicles slowly travel around them is most likely an accident). The reporting module 370 can include the processing results in the report information.

Thus, by forming an initial vehicular micro cloud the vehicle 102 can greatly enhance its information gathering capability and data processing capability. Where a single vehicle may be unable to correctly access the source of a situation automatically, for example, due to lack of line of sight to the source or lack of sensor/processing capability, a vehicular micro cloud may have an increased chance of not only identifying the source of the situation, but also obtaining critical details, such as how many vehicles were involved, whether the event has moved to the shoulder of the highway, or if it is still in the highway, which lanes are blocked, etc.

Figure 4:
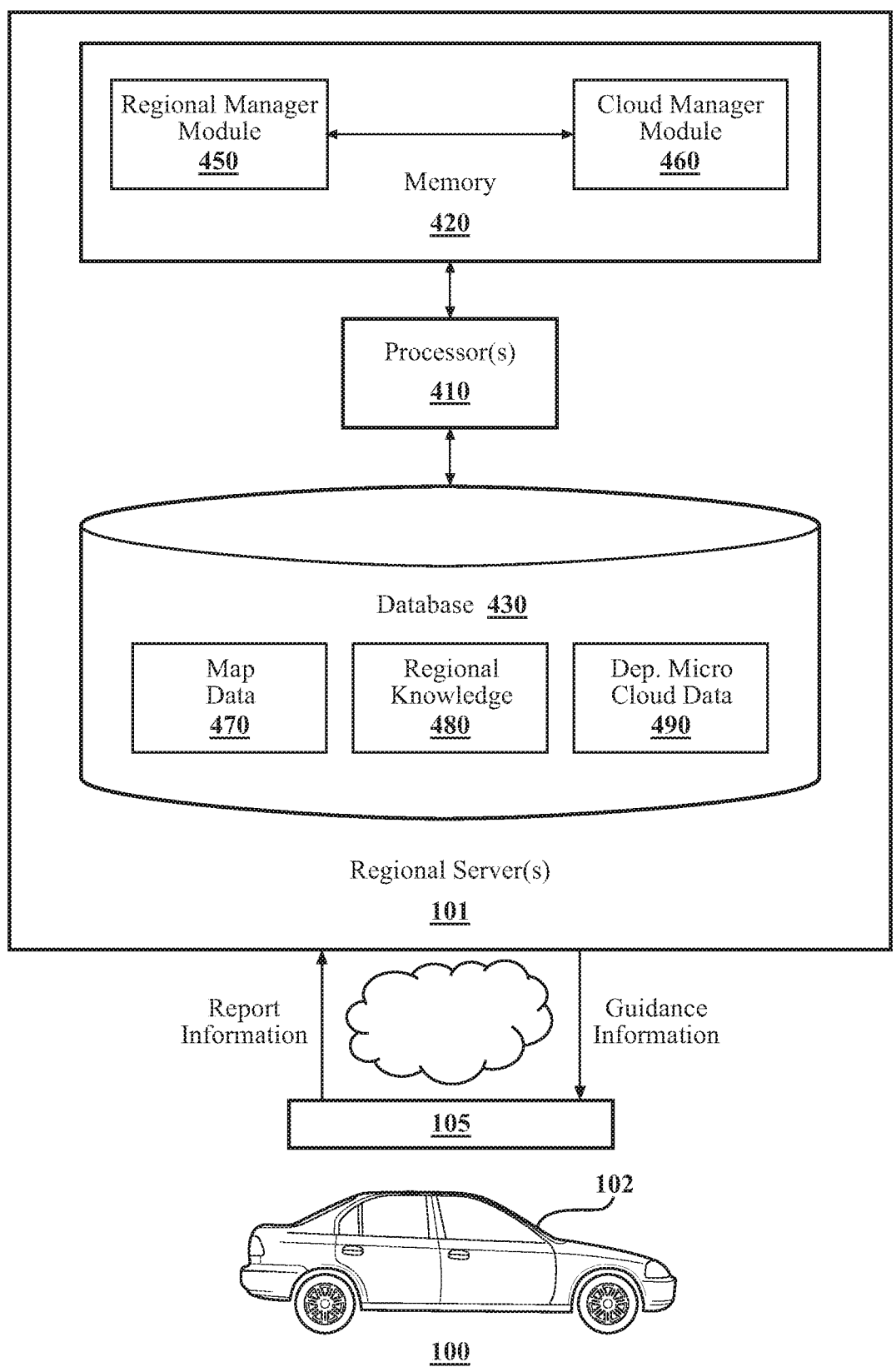
FIG. 4 illustrate one embodiment of a regional server according to the disclosed embodiments.

FIG. 4 shows an example embodiment of the regional server 101. The server 101 can be implemented, for example, as a central server, a cloud server, an edge serve, a cloud-based computing device or other network-connected computing device that can communicate with one or more external devices, or a group of connected devices (e.g., road-side units, stationary vehicles, etc.).

The regional server 101 is shown including one or more processors 410, a memory 420, and database 430. In other embodiments, more or fewer components than those shown can be included according to an implementation of the disclosed subject matter. Generally, the regional server 101 can be constructed, for example, as one or more network servers, particularly Internet accessible servers, including network interface circuitry configured to connect the processor(s) 410 to the network, such as the Internet or a cellular telephone network.

The memory 420 can be implemented as a random-access memory (RAM), read-only memory (ROM), a hard-disk drive, a flash memory, or other suitable memory for storing, among other things, a regional manager module 450 and a cloud manager module 460. The modules 450 and 460 will be described further below.

The database 430 can store, among other information, map data 470, regional knowledge 480 and dependent vehicular micro cloud data 490, which will be also described further below. The database 430 is, in one or more embodiments, an electronic data structure that can be a data store. The database 430 is configured with routines that can be executed by the processor 410 for analyzing stored data, accessing and providing stored data, organizing stored data, and so on. Thus, in one embodiment, the database 430 stores and manages/updates data, such as map data 470, regional knowledge 480 and dependent vehicular micro cloud data 490, as well as other types of data that are used by modules 450 and 460 in executing various functions.

The regional manager module 450 generally includes instructions that function to control the processor(s) 410 to receive the report information from the vehicle 102 and define one or more regions of interest based at least in part on the report information. In one or more embodiments, a region of interest can be defined relative to a core area, where the core area is an area estimated to encompass the subject of the report information.

For example, in one implementation a core area may be defined as an area having a radius of 0.5 miles centered on a location of an accident as indicated in the received report information. The regional manager module 450 can store the information as regional knowledge 480 in association with the map data 470. A region of interest can be defined, based on the map data, as a region outside of the core area that includes means of egress (e.g., roads, streets, highways, etc.) into or out of the core area, is directly or indirectly connected to the core area, or otherwise feeds traffic into the core area.

The cloud manager module 460 generally includes instructions that function to control the processor(s) 410 to form a dependent vehicular micro cloud in the region of interest, determine guidance information based at least in part on the report information, and transmit the guidance information to the dependent vehicular micro cloud. In response, the dependent vehicular micro cloud and/or vehicle members of the dependent vehicular micro cloud can execute at least one evasive or responsive action based on the guidance information.

In one or more embodiments, the cloud manager module 460 can directly transmit the relevant regional knowledge 480 to the dependent vehicular micro cloud as guidance information. For example, the guidance information can include a description of the event in the core area and a location of the core area. In response, the dependent vehicular micro cloud can make a determination of an evasive or responsive action to execute.

In one or more embodiments, the cloud manager module 460 can include one or more path finding algorithms and can augment the guidance information to include a strategy or recommendation based on an analysis of the regional knowledge 480 and the map data 470. For example, in one instance the cloud manager module 460 can analyze map data 470 to determine a detour that will allow the dependent micro cloud in a region of interest to avoid the core area. As another example, in one instance the cloud manager module 460 can analyze map data 470, determine that no available detour will expedite getting the dependent vehicular micro cloud past the core area and provide guidance information indicating a recommended formation/lane position for the dependent vehicular micro cloud to execute to expedite navigating through the core area. The cloud manager module 460 can store the current strategy/recommendation provided to a dependent vehicular micro cloud as dependent vehicular micro cloud data 490 in the database 430.

In one or more embodiments, the regional manager module 450 can continually receive report information from the initial vehicular micro cloud in or near the core area and correspondingly continually update the regional knowledge 480 regarding the core area. Likewise, the cloud manager module 460 can continually update and retransmit dependent vehicular micro cloud data 490 for one or more dependent vehicular micro clouds in various regions of interest.

Figure 5:
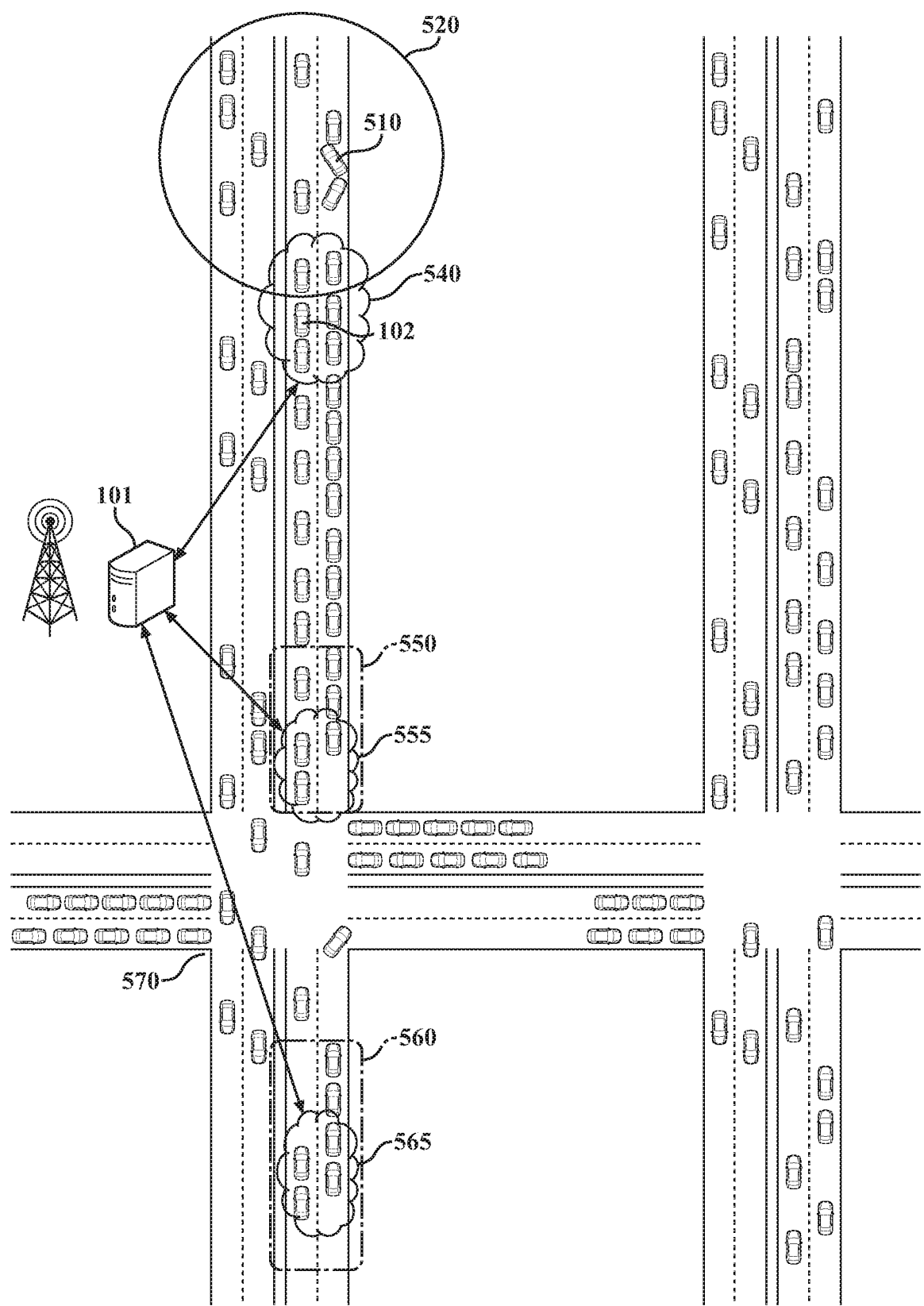
FIG. 5 illustrates an example scene in which the disclosed embodiments may be applied.

FIG. 5 shows an example scene 500 in which the disclosed embodiments may be applied. In the example scene 500, a traffic event 510 (e.g., an accident) has occurred. The vehicle 102 (e.g., detection module 350, FIG. 3) detects the traffic event 510. For example, the detection module 350 can receive a PCN from a vehicle involved in the accident of the traffic event 510, or can analyze sensor data 119 obtained from one or more environment sensors 122 to detect abnormal behavior patterns that indicate the traffic event 510 has occurred, or can utilize another method to detect the traffic event 510. The detection module 350 can save the data associated with detecting the traffic event 510 as event data 380 (FIG. 3).

The vehicle 102 (e.g., formation module 360, FIG. 3) broadcasts or transmits communications to one or more other vehicles in a vicinity of the vehicle 102 to request joining together to form an initial vehicular micro cloud. When the other vehicles affirmatively respond, the formation module 360 establishes the necessary communication channels and protocols to create the vehicular micro cloud 540 and stores information related to the other vehicle members of the vehicular micro cloud 540 as micro cloud data 385 (FIG. 3). After the vehicular micro cloud 540 is established, the formation module 360 can submit a task to the vehicular micro cloud 540 for collaborative execution. The task may include gathering information that is, or appears to be, associated with the traffic event 510.

The vehicular micro cloud 540 can collaboratively execute the task and collect information regarding the traffic event 510. For example, different vehicle members in the vehicular micro cloud 540 may have different viewing perspectives, different sensing and/or data procession capabilities, etc. The vehicle 102 (e.g., reporting module 370) can aggregate the information collected by the vehicular micro cloud 540 along with the event data 380 into a collective report that may be more comprehensive than the event data 380 alone and transmit the report to regional server 101 as report information (FIG. 4). The report information can further include location data associated with the traffic information.

The regional server 101 (e.g., regional manager module 450, FIG. 4) can receive the report information and define a core area 520 and one or more regions of interest based on the report information and map data 470 (FIG. 4). The regions of interest can include areas through which vehicles may traverse prior to reaching the core area 520. For example, the regional manager module 450 can define region of interest 550 and region of interest 560 as regions of interest as map data 470 may indicate that vehicles passing through these regions may proceed to eventually reach the core area. The regional manager module 450 can further store the report information as regional knowledge 480 (FIG. 4).

The regional server 101 (e.g., cloud manager module 460, FIG. 4) can transmit or broadcast a communication to vehicles in the regions of interest 550, 560, requesting that the vehicles form one or more dependent vehicular micro clouds. The cloud manager module 460 can transmit the communication, for example, by utilizing a cellular network, one or more road-side units in or near the regions of interest 550, 560 that are in communication with the regional server 101, one or more vehicles (stationary or in transit) in or near the regions of interest 550, 560 that are in communication with the server 101, or through another wireless communication method.

In response to the communication from the cloud manager module 460, a plurality of vehicles may affirmatively respond and establish communication channels and protocols to form one or more dependent vehicular micro clouds. For example, a group of three vehicles may form a dependent micro cloud 555 in region of interest 550, while a group of four vehicles may form a second dependent micro cloud 565 in region of interest 560. In another example, one or more parked vehicles (not shown) may form a stationary dependent vehicular micro cloud.

The cloud manager module 460 can store information associated with the dependent vehicular micro clouds 555, 565 as dependent vehicular micro cloud data 490 (FIG. 4). For example, the dependent vehicular micro cloud data 490 can include the number of vehicle members, information on the vehicle members (e.g., vehicle make and model, sensor capabilities, etc.), and the location of the associated dependent micro cloud. In one or more embodiments, the cloud manager module 460 can obtain current route plan data from one or more vehicle members of the dependent micro cloud and store the route plan data as part of the dependent vehicular micro cloud data 490.

The cloud manager module 460 can determine guidance information associated with a region of interest, based at least in part on the report information recorded in the regional knowledge 480, and transmit the guidance information to the dependent vehicular micro cloud. In one or more embodiments, the guidance information can be specific to each region of interest. In one or more embodiments, the guidance information can further be specific to each dependent vehicular micro cloud.

For example, referring to FIG. 5, the cloud manager module 460 can determine that dependent vehicular micro cloud 555 is approaching the core area 520 along a route that does not have any possible exits that the dependent vehicular micro cloud 555 can take before reaching the core area 520. Accordingly, the cloud manager module 460 can determine a recommended approach for the dependent vehicular micro cloud 555 to pass through the core area 520. In this case, the cloud manager module 460 can determine, based on the information in the regional knowledge 480, that a right lane of the highway is blocked in the core area 520. Accordingly, the cloud manager module 460 can generate guidance information recommending that the dependent vehicular micro cloud 555 execute a single-file, inline formation proceeding in the left lane.

In response to the guidance information, the dependent vehicular micro cloud 555 can execute the recommendation before reaching the core area 520, i.e., the vehicle members may form a single file line formation traveling in the left lane.

In contrast, the cloud manager module 460 can determine that the dependent vehicular micro cloud 565 is approaching the core area 520 along a route that has at least one possible exit (e.g., at intersection 570) that the dependent vehicular micro cloud 565 can take before reaching the core area 520. Accordingly, in one or more embodiments the cloud manager module 460 can analyze map data 470 to determine whether the exit can function as a valid detour to bypass the core area 520. For example, the cloud manager module 460 can determine, based on the map data 470, that a path exists via the exit at intersection 570 for the dependent vehicular micro cloud 555 to circumvent the core area 520 and resume travel on the original road.

The cloud manager module 460 can therefore generate guidance information recommending that the dependent vehicular micro cloud 555 exit at intersection 570. In one or more embodiments, the guidance information can include a detour plan for circumventing the core area 520. In response to the guidance information, the dependent vehicular micro cloud 565 can execute the recommendation before reaching the core area 520, i.e., the vehicle members may exit at intersection 570.

In one or more embodiments, the regional manager module 450 may continue to receive location and information updates from the on-demand vehicular micro cloud 540 and the dependent vehicular micro clouds 555, 565, and may further monitor the core area 520 and/or the region(s) of interest 550, 560 for additional information from secondary sources, such as websites, traffic reports, etc. Accordingly, the regional manager module 450 may continually or periodically update the regional knowledge 480, and the cloud manager module 460 may continually or periodically transmit updated information to the on-demand vehicular micro cloud 540 and the dependent vehicular micro clouds 555, 565 based on the regional knowledge 480.

In one or more embodiments, the cloud manager module 460 can continually or periodically adjust the guidance information transmitted to the dependent vehicular micro clouds 555, 565 based on the most recent regional knowledge 480 and the current location of the dependent vehicular micro clouds 555, 565. For example, while a dependent vehicular micro cloud is relatively far from the core area 520, the guidance information may recommend taking an alternate route. However, as the dependent vehicular micro cloud continues toward the core area 520, the updated regional knowledge 480 from the on-demand vehicular micro cloud and/or other closer dependent vehicular micro clouds may indicate that the traffic event 510 has been resolved and traffic is flowing smoothly through the core area 520. In this situation, the cloud manager module 460 may adjust the guidance information to recommend proceeding directly through the core area 520.

Thus, vehicle members in the dependent vehicular micro clouds 555, 565 may receive up-to-date knowledge and guidance directed toward optimizing navigation past the traffic event 510 in the core area 520 before they reach the core area 520 and as they approach.

Although the above-discussed example uses two dependent vehicular micro clouds, the disclosed subject matter is not limited in the number of dependent vehicular micro clouds. In one or more embodiments, the cloud manager module 460 can create, for example, three or more dependent vehicular micro clouds initially and subsequently create additional dependent vehicular micro clouds, e.g., in new regions of interest or as micro clouds from the first set complete navigation past the core area. In addition, the cloud manager module 460 can monitor the status and size of the dependent vehicular micro clouds as they progress and invite additional vehicles to join existing dependent vehicular micro clouds, e.g., as members exit the micro clouds to travel to different destinations or pass through stationary dependent vehicular micro clouds.

Generally, the use of multiple dependent micro clouds gathering information at varying distances from a core area can allow for enhanced regional knowledge regarding the core area. For example, the cloud manager module 460 can determine how long a line of traffic is leading up to the core area, or the traffic flow in various alternate routes being traveled by dependent vehicular micro clouds. Thus, the disclosed vehicular micro cloud coordination system 100 can provide an automated service that improves traffic flow, reduces congestion around traffic events and reduces individual trip time for vehicle members of the dependent vehicular micro clouds by providing enhanced regional knowledge and guidance prior to the vehicle members' arrival at the core area of a traffic event.

Figure 6:
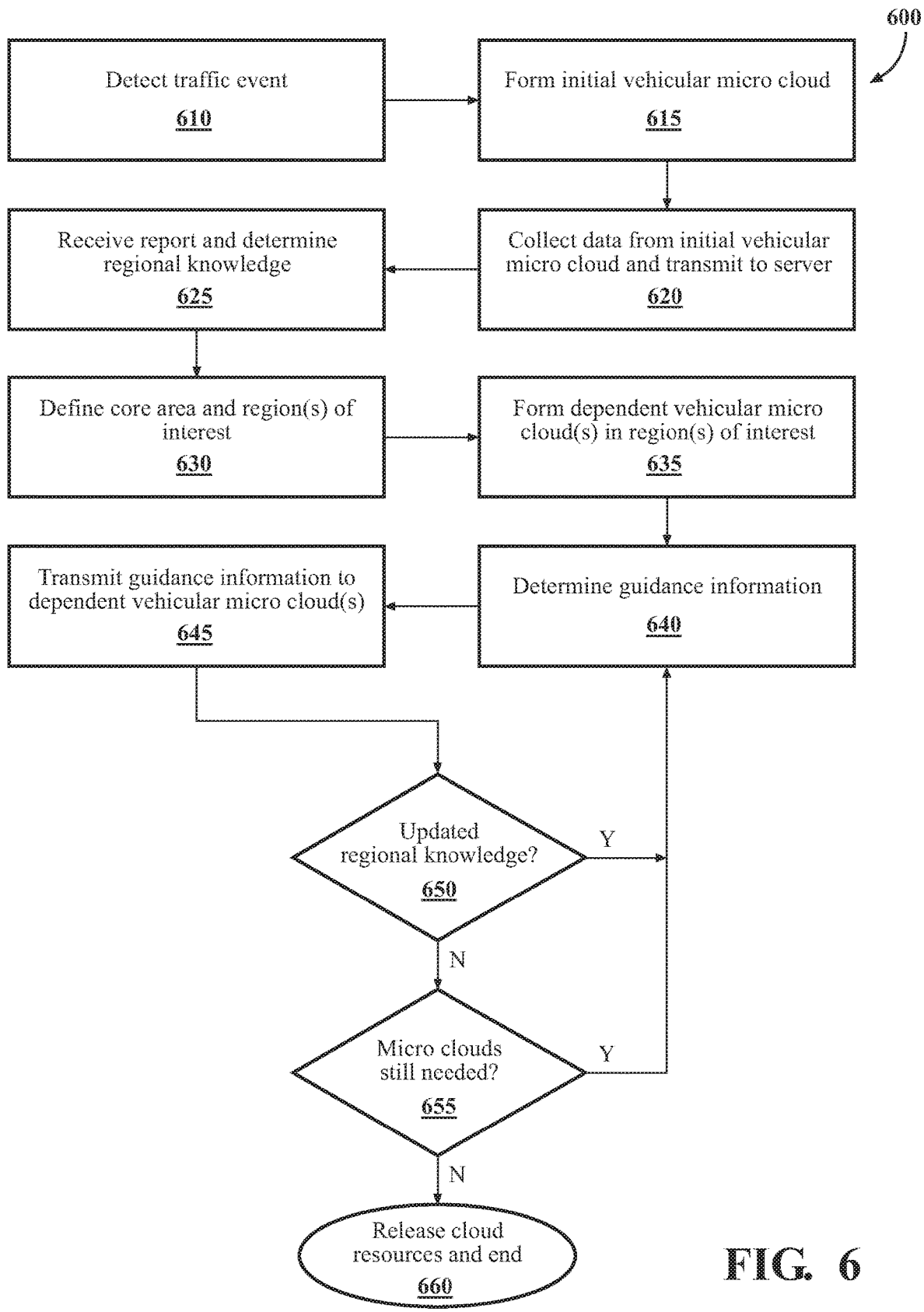
FIG. 6 illustrates a flowchart of a method of creating and utilizing one or more vehicular micro clouds according to the disclosed embodiments.

FIG. 6 illustrates a flowchart of a method 600 of creating and utilizing one or more vehicular micro clouds to assist in navigation past a traffic event according to the disclosed embodiments. Method 600 will be discussed from the perspective of the vehicular micro cloud coordination system 100 of FIG. 1. While method 600 is discussed in combination with the vehicular micro cloud coordination system 100, it should be understood that the method 600 is not limited to implementation within the vehicular micro cloud coordination system 100, which is merely one example of a system that may implement the method 600. It should further be understood that the order of operations can change in various implementations of the method 600.

At operation 610, the vehicular micro cloud coordination system 100 (e.g., detection module 350, FIG. 3) detects a traffic event. The detection module 350 can be a component of an onboard unit 105 of a vehicle 102 (FIG. 1) that, in one or more embodiments, detects the traffic event, for example, by receiving a PCN message broadcast from another vehicle involved in an accident, detecting abnormal speed and/or movement patterns in traffic, detecting entry into a type of zone, or using other techniques.

At operation 615, the vehicular micro cloud coordination system 100 (e.g., formation module 360) broadcasts one or more communications to vehicles in a vicinity of the vehicle 102 inviting them to form a vehicular micro cloud. When one or more vehicles respond affirmatively the formation module 360 establishes communication channels and protocols to create an initial vehicular micro cloud. The formation module 360 submits a task to the initial vehicular micro cloud for collaborative execution, the task being to obtain data about the traffic event.

At operation 620, the vehicular micro cloud coordination system 100 (e.g., reporting module 370) collects and/or aggregates the data obtained by the initial vehicular micro cloud and creates a report. In one or more embodiments, the report includes the data relevant to the traffic event and location information associated with the data, indicting where the data was collected. In one or more embodiments, if the formation module 360 was unable to form an initial vehicular micro cloud (e.g., did not receive any affirmative response or the setup otherwise experienced a failure), the reporting module 370 creates the report based information that the vehicle 102 has managed to obtain. In any case, the reporting module 370 transmits the report to a regional server 101.

At operation 625, the regional server 101 (e.g., regional manager module 450, FIG. 4) receives the report and, based on the data included therein, determines and stores regional knowledge. The regional knowledge can include, for example, one or more conclusions and/or determinations regarding the traffic event (e.g., the event is a three-car accident that is currently sitting in the right lane near highway marker 86, etc.).

At operation 630, the regional manager module 450 can define a region of interest based at least in part on the report information as indicated in the regional knowledge. In one or more embodiments the regional manager module 450 can further define a core area in a vicinity of the traffic event and define the region of interest at a location displaced from the core area based, at least in part, on map data indicating that a vehicle in the region of interest is on a trajectory that can pass through the core area.

For example, in one or more embodiments, the regional manager module 450 can define the core area as an area within a predetermined range of the traffic event (e.g., within 100 meters, or within 0.5 miles, etc.) and define the region of interest as an area through which vehicles may travel along a route that will pass through the core area. In one or more embodiments, the regional manager module 450 can define multiple regions of interest of varying distances from the core area.

At operation 635, the regional server 101 (e.g., cloud manager module 460, FIG. 4) forms a dependent vehicular micro cloud in the region of interest. For example, in one or more embodiments the cloud manager module 460 can broadcast a message to two or more vehicles in or approaching the region of interest requesting the vehicles establish communication channels and protocols to form a vehicular micro cloud. In one or more embodiments, where the regional manager module 450 has defined a plurality of regions of interest the cloud manager module 460 can form or attempt to form at least one dependent vehicular micro cloud in each region of interest.

The cloud manager module 460 can store and track information related to each dependent vehicular micro cloud that is established. The information can include, for example, the location of the dependent vehicular micro cloud and, as will be described below, guidance information that has been transmitted to the dependent vehicular micro cloud.

At operation 640, the cloud manager module 460 can determine guidance information based at least in part on the report information (i.e., the regional knowledge). In one or more embodiments, the guidance information is simply the regional knowledge, leaving the dependent vehicular micro cloud to determine how best to proceed in view of the regional knowledge. In one or more embodiments the cloud manager module 460 can process the regional knowledge comprehensively to determine specific recommendations for each dependent vehicular micro cloud. In this case, the guidance information can include at least one or more of a micro cloud operation (e.g., execute a specific operation in response to the event), a vehicular micro cloud formation command (e.g., travel in an in-line formation), a vehicular micro cloud lane command (e.g., travel in the left-most lane), and a vehicular micro cloud alternate route instruction (e.g., take the next exit and follow an alternate route to bypass the core area).

At operation 645, the cloud manager module 460 can transmit the guidance information to the dependent vehicular micro cloud(s). In response to the guidance information, the dependent vehicular micro cloud(s) can execute at least one evasive action based on the guidance information, prior to arriving at the core area.

At operation 650, the cloud manager module 460 can determine whether the regional knowledge has been updated since the most recent transmission of guidance information. For example, the initial vehicular micro cloud and/or one or more dependent vehicular micro clouds may have transmitted more up-to-date report information. Or, in one or more embodiments, the regional manager module 450 can obtain information from one or more secondary sources (e.g., traffic report service, weather report service, etc.) to update the regional knowledge. In any case, if the cloud manager module 460 determines that the regional knowledge has been updated since the last transmission of guidance information to a dependent vehicular micro cloud, the process returns to operation 640 and the cloud manager module 460 determines whether to send new guidance information.

If the regional knowledge has not been updated, at operation 655 the cloud manager module 460 determines whether the initial and dependent vehicular micro clouds are still needed for assisting vehicles in navigating past or through the core area. For example, if the regional knowledge indicates that the traffic event has been resolved and traffic is flowing through the core area as normal, the vehicular micro clouds are no longer need. If the cloud manager module 460 determines that the vehicular micro clouds are still needed, the process continues at operation 640 and the cloud manager module 460 again determines whether to update the guidance information.

If the cloud manager module 460 determines that the vehicular micro clouds are no longer needed, then the process ends at operation 660 and the cloud manager module 460 releases cloud resources.

Thus, the disclosed vehicular micro cloud coordination system 100 can create and utilize vehicular micro clouds, for example, to assist vehicles in navigating past traffic events or to aid vehicles in general travel along routes.

As discussed above, the vehicular micro cloud coordination system 100 can include one or more modules, at least some of which are described herein. The modules can be implemented as computer-readable program code that, when executed by a processor 110 (and/or processor 410), implement one or more of the various processes described herein. One or more of the modules can be a component of the processor(s) 110/410, or one or more of the modules can be executed on and/or distributed among other processing systems to which the processor(s) 110/410 is operatively connected. The modules can include instructions (e.g., program logic) executable by one or more processor(s) 110/410. Alternatively, or in addition, one or more data stores of the vehicular micro cloud coordination system (e.g., database 330) may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

FIG. 2 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 102 can be a conventional vehicle that is configured to operate in either an autonomous mode or a manual mode.

In one or more embodiments, the vehicle 102 is an autonomous vehicle. As used herein, "autonomous vehicle" refers to a vehicle that operates and executes various driving functions autonomously. More specifically, "autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 110. In one or more arrangements, the processor(s) 110 can be a main processor of the vehicle 102. For instance, the processor(s) 110 can be an electronic control unit (ECU). The vehicle 102 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can store sensor data 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 102 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 102 (including any of the elements shown in FIG. 2). The sensor system 120 can acquire data of at least a portion of the external environment of the vehicle 102 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 102. In one or more arrangements, the vehicle sensor(s) 121 can include a speedometer to determine a current speed of the vehicle 102.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 102 and/or information/data about such obstacles. Such obstacles may be stationary objects and/or dynamic objects. The one or more environment sensors 122 can be configured to detect, measure, quantify and/or sense other things in the external environment of the vehicle 102, such as, for example, lane markers, signs, traffic lights, traffic signs, lane lines, crosswalks, curbs proximate the vehicle 102, pedestrians, bicyclists, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 102 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 102 can include an output system 135. An "output system" includes any device, component, or arrangement or groups thereof that enable information/data to be presented to a vehicle passenger (e.g., a person, a vehicle passenger, etc.).

The vehicle 102 can include one or more vehicle systems 140. Various examples of the one or more vehicle systems 140 are shown in FIG. 2. However, the vehicle 102 can include more, fewer, or different vehicle systems. It should be appreciated that although particular vehicle systems are separately defined, each or any of the systems or portions thereof may be otherwise combined or segregated via hardware and/or software within the vehicle 102. The vehicle 102 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 102 and/or to determine a travel route for the vehicle 102. The navigation system 147 can include one or more mapping applications to determine a travel route for the vehicle 102. The navigation system 147 can include a global positioning system, a local positioning system or a geolocation system.

The vehicle 102 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 102 can include one or more autonomous driving modules 160. The autonomous driving module(s) 160 can be configured to receive data from the sensor system 120 and/or any other type of system capable of capturing information relating to the vehicle 102 and/or the external environment of the vehicle 102. In one or more arrangements, the autonomous driving module(s) 160 can use such data to generate one or more driving scene models. The autonomous driving module(s) 160 can determine position and velocity of the vehicle 102. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 102 for use by the processor(s) 110, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The autonomous driving module(s) 160 can be configured to determine trajectory plans and travel path(s), and determine current autonomous driving maneuvers for the vehicle 102, future autonomous driving maneuvers and/or modifications to current autonomous driving maneuvers based on data acquired by the sensor system, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 102 or one or more systems thereof (e.g., one or more of vehicle systems 140).

The processor(s) 110 and/or the autonomous driving module(s) 160 can be operatively connected to communicate with the various vehicle systems 140 and/or individual components thereof. For example, returning to FIG. 2, the processor(s) 110 and/or the autonomous driving module(s) 160 can be in communication to send and/or receive information from the various vehicle systems 140 to determine/set a trajectory plan and/or control the movement, speed, maneuvering, heading, direction, etc. of the vehicle 102. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 102 by controlling one or more of the vehicle systems 140 and/or components thereof. For instance, when operating in an autonomous mode, the processor(s) 110 and/or the autonomous driving module(s) 160 can control the direction and/or speed of the vehicle 102, e.g., to move toward an optimal alignment position. The processor(s) 110 and/or the autonomous driving module(s) 160 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for creating and utilizing one or more vehicular micro clouds to assist in responding to a traffic event, comprising:
    a vehicle onboard unit, including:
        a first set of one or more processors; and
        a first memory communicably coupled to the first set of one or more processors and storing:
            a first set of instructions that when executed by the first set of one or more processors cause the first set of one or more processors to detect the traffic event,
            a second set of instructions that when executed by the first set of one or more processors cause the first set of one or more processors to broadcast one or more communications to form a vehicular micro cloud to obtain data about the traffic event, and
            a third set of instructions that when executed by the first set of one or more processors cause the first set of one or more processors to collect the data obtained by the vehicular micro cloud and transmit report information to a server, the report information including the data and location information of a location associated with the data; and
    the server, including:
        a second set of one or more processors; and
        a second memory communicably coupled to the second set of one or more processors and storing:
            a fourth set of instructions that when executed by the second set of one or more processors cause the second set of one or more processors to receive the report information and define a region of interest based at least in part on the report information, and
            a fifth set of instructions that when executed by the second set of one or more processors cause the second set of one or more processors to form a dependent vehicular micro cloud in the region of interest, determine guidance information based at least in part on the report information, and transmit the guidance information to the dependent vehicular micro cloud,
    wherein the dependent vehicular micro cloud is configured to execute at least one responsive action based on the guidance information, and
    wherein each of the vehicular micro cloud and the dependent vehicular micro cloud comprises at least two vehicles as members configured to communicate with each other and to share resources to collaborate on operational tasks that include at least one of environmental sensing, data processing, or data storage.

2. The system of claim 1, wherein the guidance information includes at least one of:
    a vehicular micro cloud operation command,
    a vehicular micro cloud formation command,
    a vehicular micro cloud lane command, or
    a vehicular micro cloud alternate route instruction.

3. The system of claim 1, wherein the fourth set of instructions further includes instructions to define a core area in a vicinity of the traffic event and define the region of interest at a location displaced from the core area based, at least in part, on map data indicating that a vehicle in the region of interest is on a trajectory capable of passing through the core area.

4. The system of claim 3, wherein the guidance information causes a vehicle member of the dependent vehicular micro cloud to execute the at least one responsive action before the vehicle member of the dependent vehicular micro cloud arrives at the core area.

5. The system of claim 3, wherein the fourth set of instructions further includes instructions to define a plurality of regions of interest of varying distances from the core area, and the fifth set of instructions further includes instructions to form at least one dependent vehicular micro cloud in each of the plurality of regions of interest.

6. A system for creating and utilizing one or more vehicular micro clouds to assist in responding to a traffic event, comprising:
    one or more processors; and
    a memory communicably coupled to the one or more processors and storing:
        a first set of instructions that when executed by the one or more processors cause the one or more processors to:
            receive report information indicating a detection of the traffic event and including a location of the traffic event, and
            define a region of interest based at least in part on the report information, and
        a second set of including instructions that when executed by the one or more processors cause the one or more processors to form a dependent vehicular micro cloud in the region of interest, determine guidance information based at least in part on the report information, and transmit the guidance information to the dependent vehicular micro cloud,
    wherein the dependent vehicular micro cloud is configured to execute at least one responsive action based on the guidance information, and
    wherein the dependent vehicular micro cloud comprises at least two vehicles as members configured to communicate with each other and to share resources to collaborate on operational tasks that include at least one of environmental sensing, data processing, or data storage.

7. The system of claim 6, wherein the guidance information includes at least one of:
    a vehicular micro cloud operation command,
    a vehicular micro cloud formation command,
    a vehicular micro cloud lane command, or
    a vehicular micro cloud alternate route instruction.

8. The system of claim 6, wherein the first set of further includes instructions to define a core area in a vicinity of the traffic event and define the region of interest at a location displaced from the core area based, at least in part, on map data indicating that a vehicle in the region of interest is on a trajectory capable of passing through the core area.

9. The system of claim 8, wherein the guidance information causes a vehicle member of the dependent vehicular micro cloud to execute the at least one responsive action before the vehicle member of the dependent vehicular micro cloud arrives at the core area.

10. The system of claim 8, wherein the first set of further includes instructions to define a plurality of regions of interest of varying distances from the core area, and the second set of further includes instructions to form at least one dependent vehicular micro cloud in each of the plurality of regions of interest.

11. A method for creating and utilizing one or more vehicular micro clouds to assist in responding to a traffic event, comprising:
   detecting the traffic event;
   forming an initial vehicular micro cloud to obtain data about the traffic event;
   collecting the data obtained by the initial vehicular micro cloud;
   transmitting report information to a server, the report information including the data and location information of a location associated with the data;
   defining, by the server, a region of interest based at least in part on the report information;
   forming, by the server, a dependent vehicular micro cloud in the region of interest;
   determining, by the server, guidance information based at least in part on the report information; and
   transmitting, by the server, the guidance information to the dependent vehicular micro cloud,
   wherein the dependent vehicular micro cloud is configured to execute at least one responsive action based on the guidance information, and
   wherein each of the initial vehicular micro cloud and the dependent vehicular micro cloud comprises at least two vehicles as members configured to communicate with each other and to share resources to collaborate on operational tasks that include at least one of environmental sensing, data processing, or data storage.

12. The method of claim 11, wherein the guidance information includes at least one of:
   a vehicular micro cloud operation command,
   a vehicular micro cloud formation command,
   a vehicular micro cloud lane command, or
   a vehicular micro cloud alternate route instruction.

13. The method of claim 11, further comprising:
   defining, by the server, a core area in a vicinity of the traffic event; and
   defining the region of interest at a location displaced from the core area based, at least in part, on map data indicating that a vehicle in the region of interest is on a trajectory capable of passing through the core area.

14. The method of claim 13, wherein the guidance information causes a vehicle member of the dependent vehicular micro cloud to execute the at least one responsive action before the vehicle member of the dependent vehicular micro cloud arrives at the core area.

15. The method of claim 13, further comprising:
   defining, by the server, a plurality of regions of interest of varying distances from the core area; and
   forming, by the server, at least one dependent vehicular micro cloud in each of the plurality of regions of interest.

16. A method for creating and utilizing one or more vehicular micro clouds to assist in responding to a traffic event, comprising:
   receiving report information indicating a detection of the traffic event and including a location of the traffic event;
   defining a region of interest based at least in part on the report information;
   forming a dependent vehicular micro cloud in the region of interest;
   determining guidance information based at least in part on the report information; and
   transmitting the guidance information to the dependent vehicular micro cloud,
   wherein the dependent vehicular micro cloud is configured to execute at least one responsive action based on the guidance information, and
   wherein the dependent vehicular micro cloud comprises at least two vehicles as members configured to communicate with each other and to share resources to collaborate on operational tasks that include at least one of environmental sensing, data processing, or data storage.

17. The method of claim 16, wherein the guidance information includes at least one of:
   a vehicular micro cloud operation command,
   a vehicular micro cloud formation command,
   a vehicular micro cloud lane command, or
   a vehicular micro cloud alternate route instruction.

18. The method of claim 16, further comprising:
   defining a core area in a vicinity of the traffic event; and
   defining the region of interest at a location displaced from the core area based, at least in part, on map data indicating that a vehicle in the region of interest is on a trajectory capable of passing through the core area.

19. The method of claim 18, wherein the guidance information causes a vehicle member of the dependent vehicular micro cloud to execute the at least one responsive action before the vehicle member of the dependent vehicular micro cloud arrives at the core area.

20. The method of claim 18, further comprising:
   defining a plurality of regions of interest of varying distances from the core area; and
   forming at least one dependent vehicular micro cloud in each of the plurality of regions of interest.

21. A system, comprising:
   a processor; and
   a memory storing instructions that cause the processor to:
      detect a traffic event,
      broadcast a communication to form a vehicular micro cloud to obtain data about the traffic event, the vehicular micro cloud comprising at least two vehicles configured to communicate with each other and to share resources to collaborate on at least one of environmental sensing, data processing, or data storage,
      collect the data obtained by the vehicular micro cloud, and
      transmit report information to a server, the report information including the data and location information of a location associated with the data.

* * * * *

UNITED STATES PATENT AND TRADEMARK OFFICE
CERTIFICATE OF CORRECTION

PATENT NO. : 11,410,548 B2
APPLICATION NO. : 16/847197
DATED : August 9, 2022
INVENTOR(S) : Seyhan Ucar et al.

It is certified that error appears in the above-identified patent and that said Letters Patent is hereby corrected as shown below:

In the Claims

Claim 8, Line 1: delete "the first set of further includes" insert --the first set of instructions further includes--.

Claim 10, Line 1: delete "the first set of further includes" insert --the first set of instructions further includes--.

Claim 10, Lines 3 and 4: delete "the second set of further includes" insert --the second set of instructions further includes--.

Signed and Sealed this
Twenty-fifth Day of October, 2022

Katherine Kelly Vidal
*Director of the United States Patent and Trademark Office*